United States Patent [19]
Barron

[11] 4,008,371
[45] Feb. 15, 1977

[54] IMAGING SYSTEMS

[75] Inventor: Donald Robert Barron, Sunbury-on-Thames, England

[73] Assignee: EMI Limited, Hayes, England

[22] Filed: Aug. 6, 1975

[21] Appl. No.: 602,412

[30] Foreign Application Priority Data

Aug. 8, 1974 United Kingdom ............ 35077/74

[52] U.S. Cl. .......................... 358/206; 178/DIG. 8; 350/285
[51] Int. Cl.[2] ...................... H04N 3/08; H04N 7/18
[58] Field of Search ...................... 178/7.6, DIG. 8; 250/334; 350/6, 7, 285

[56] References Cited
UNITED STATES PATENTS

| | | | |
|---|---|---|---|
| 3,626,091 | 12/1971 | Casper | 178/7.6 |
| 3,804,976 | 4/1974 | Gard | 250/334 |
| 3,895,182 | 7/1975 | Trilling | 178/DIG. 8 |

*Primary Examiner*—Howard W. Britton
*Attorney, Agent, or Firm*—Fleit & Jacobson

[57] ABSTRACT

Scanning imaging systems are described in which an image of a viewed area is scanned across a detector by a line and frame scanning arrangement including a rotatable faceted mirror drum which is of smaller size than hitherto as radiation going to and from the drum passes through an optical system of two elements separated by their focal length. For radiation passing to the drum the optical system can be an objective lens and a collimating lens to produce a small exit pupil within the circumcircle of the drum facets. The drum and a plane oscillatable mirror may both scan the viewed area image of collimated radiation across the detector to permit the generation of a sequential radiation intensity signal and recreate an image, which may be viewable by eye through the optical system, by scanning a beam of parallel light of intensity corresponding to the radiation signal.

11 Claims, 2 Drawing Figures

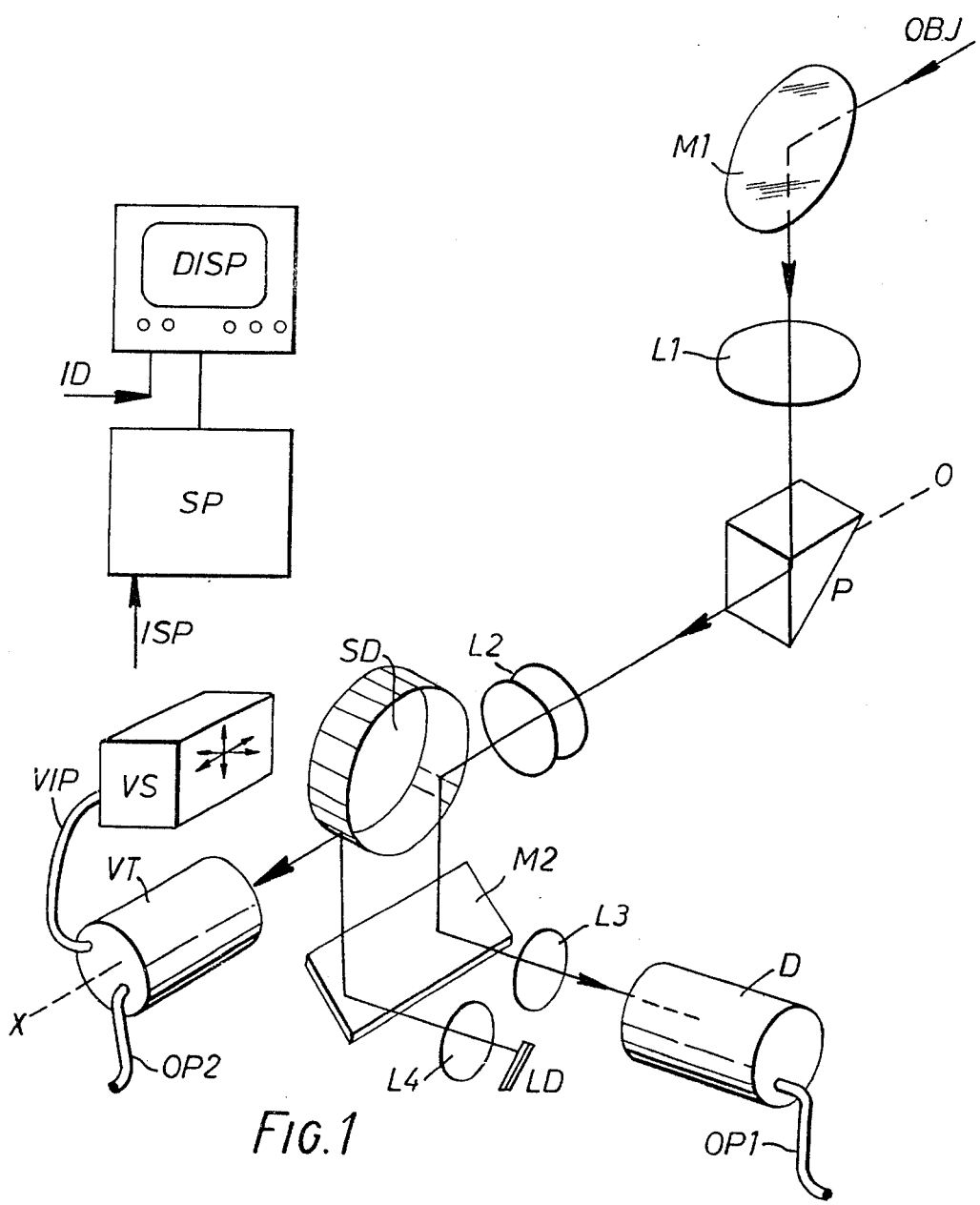

IMAGING SYSTEMS

This invention relates to imaging systems.

A known method of scanning a field of view for imaging purposes employs a multi-faceted rotating drum. Drums are known with two, eight and 12 facets and with facets inclined at different angles to an axis of rotation. Drums with differing facets require extreme accuracy in manufacture and are therefore much more expensive than drums with equally inclined facets. In forms of apparatus in which such a drum has been employed a disadvantage can arise from the large dimension of the drum. It is known also to scan a field of view by the so-called Risley prism scanner and such a scanner can be constructed of relatively small dimensions as compared with forms of drum scanner referred to. Risley prism scanners, however, are characteristically limiting of the field of view since it is difficult to extend the linearity of their scan to more than about two-thirds of the full field. The large size of the drums proposed hitherto makes it difficult to use them in a confined space, such as is available in a vehicle, while the speed of rotation necessary for useful information rates is high having regard to the size of the drum, requiring a mechanically very strong and therefore bulky and heavy unit. In certain applications where the vehicle with the system is to be protected by thick armour plate the aperture required for radiation to reach the drum is so large as to destroy in the protection afforded to the vehicle by the armour plate. Proposals have also been made for imaging systems with two sizes of field view selected by distinct optical systems but these rely on detectors operated under cryogenic conditions to supply signals to processing circuits for the production of display on cathode ray tubes rather than direct viewing and involve cathode ray type converter tubes all of which are bulky, fragile and operate at voltages of several kilovolts, making them unattractive for portable or hand held equipment.

It is an object of the invention to provide an improved imaging system.

According to the invention there is provided in a scanning imaging system of an objective lens supported for forming a first image with radiation collected from an area of view and a scanning arrangement operable to scan radiation from said first image over a detector to form the scanned image the improvement of a collimating lens between the objective and a scanning element smaller than that required for the first image for forming from said first image a second enlarged image of said area thereby to direct the radiation collected from the area through a collimating lens exit pupil of smaller aperture than the radiation collecting aperture for deflection toward said detector by said scanning element passing between the collimating lens and its exit pupil.

According to the invention there is provided in a scanning imaging system including a scanning arrangement of a faceted mirror drum and a plane mirror operable to scan an image formed in a particular radiation across a detector sensitive to said radiation the improvement of supplying a sequential output signal of the scanned image from the detector to a light emitting element arranged to emit light sequentially in dependence on the intensity of radiation in the scanned image through a collimating lens for application as substantially parallel light to said plane mirror and faceted mirror drum to recreate in light the image scanned in said radiation and providing means to view the image away from the vicinity of the drum including an objective lens and an eyepiece to reduce the angle subtended by the image recreated by the angular displacement of the facets of the rotating drum.

According to the invention there is provided a scanning imaging system including in a hand holdable assembly a rotatable image scanning drum and oscillatable plane mirror aimable to scan an image in a selected radiation of an area of view across a detector, means to generate light in dependence on the radiation intensity of said scanned image and supply said light as a parallel beam to said mirror and drum for scanning said beam to recreate the image for viewing by eye with the aid of a lens system to reduce the angle subtended by the recreated image.

A further lens system may be selectively interposable between the drum and the area of view to enlarge the image of part of the area of view, the further lens system including an objective to collect radiation from the area and form a first image and a collimating lens to form a second enlarged image of said area radiation collected from said part of the area through a collimating lens exit pupil of smaller aperture than the radiation collecting aperture and positioned within the circumcircle of the scanning drum.

Embodiments of the invention will now be described, by way of example only, with reference to the accompanying drawings in which:

FIG. 1 shows the system in accordance with one example of the system, and

FIG. 2 is a diagrammatic representation of the basic optical aspects of the system.

Referring now to the drawings, FIG. 1 shows a typical example of the system. Radiation from an area of view indicated by a distant OBJ is incident on the mirror M1 and is reflected to an objective lens L1 and thence via the totally internally reflecting prism P along axis OX through a collimating lens L2. The action of the collimating lens L2 is to form an exit pupil of an image of the objective at S (see FIG. 2), inside the circumcircle of the facets of the multi-faceted parallel-faceted drum SD. This action can be seen more clearly in FIG. 2 wherein L1 and L2 are the objective and collimating lens respectively and the distance between said lenses is equal to the sum of their respective focal lengths.

The radiation, which may be infrared with suitable lenses and other optical elements, is focussed by lens L1 to form an image of the viewed area and collimating lens L2 forms an enlarged image of the viewed area, directing radiation through an exit pupil at S which is smaller than the radiation collecting aperture of L1. The collimating lens L2 ensures that light rays from any point on the enlarged image are substantially parallel when passing through the exit pupil. The smaller exit pupil permits a drum SD having facets smaller than would be required for a drum at the exit pupil of lens L1 alone and although exit pupil S is very close, some 20mm, to lens L2 the smaller drum, some 50mm diameter, can be rotated here without clashing with the lens L2. The smaller drum is mechanically much stiffer and lighter than a drum of some 120mm required for lens L1 alone easing problems of supporting and rotating the drum at the high speed, some ten thousands of r.p.m., to provide a sufficient line scan speed. Referring to the Figures the drum SD rotating clockwise scans said exit pupil S.

The radiation directed through lens L2 to the exit pupil S is deflected by the facets of drum SD along OY. FIG. 2 disregards mirror M2 and shows that each facet in turn deflects radiation directed to the exit pupil and sweeps it across lens L3, which focuses the radiation on detector D, to produce an output from the detector indicating any variation of the radiation intensity swept across it. Clearly the successive facets sweep the whole of the exit pupil across lens L3. By interposing a mirror M2 which is progressively tilted in an oscillating manner different parts of the exit pupil are swept across detector D and the output of the detector will be a sequence of intensity variations line by line, one line for each sweep, forming a frame of successive lines for one tilting oscillation of mirror M2. The axis of oscillation of mirror M2 is in the plane of its surface and parallel to the optical axis OX of the system shown in FIGS. 1 and 2. This system provides a frame scanning device with instant flyback since each time a different facet begins scanning a new line is scanned across said mirror M2. Each facet needs a blanking interval of some 30%.

Detector D is preferably a line of detectors which are arranged to detect in parallel mode (i.e. perpendicular to OX in a plane parallel to L3) and be scanned in columns along the mirror M2. The output from the detectors at OP1 must then be electronically processed, using known conversion methods in a signal processor SP supplied via input ISP from OP1, to enable said output to be displayed on a conventional video tube display DISP. Alternatively detector output OP1 can be used to drive an array of light emitting devices LD. The output radiation from these devices is collimated in a lens L4 and reflected from the mirror M2 and scanning drum SD into the video tube VT. The output radiation is stored on the video tube and then read off after a suitable delay enabling the parallel input to be directly converted to serial output supplied at OP2 for connection to a direct input ID to display DISP.

If the scanning drum SD is rotated quickly enough detection can be arranged in a serial mode. Detector D is a line of detectors arranged along a line (i.e. parallel to OX) with a suitable time delay between successive detectors. The output from the detectors is fed into a single light emitting device which operates in a manner similar to that in parallel mode providing radiation picked up by tube VT and supplied to input ID of display DISP without the delay referred to above. In this operation scan conversion processes are eliminated since scanning is achieved at video rates. This represents a major saving in cost and size. Further advantages of this detector arrangement are that some detectors can fail without blank lines appearing and there is an improvement in signal to noise ratio.

A further modification can be made to compensate for loss in resolution due to vibration. If the system is used in a moving vehicle, subject to vibration, this vibration would be transmitted to the observer's display and cause loss in resolution. This may be compensated for by imaging the light emitting device outputs on the face of an electronic image intensifier positioned as tube VT which is designed to have the currents in its deflection coils controlled by vibration sensors VS over energisation path VIP. In this way the image on the output of the video tube may be rendered stationary. This image can be viewed by a conventional vidicon (not shown) and supplied to display DISP.

In this foregoing example only one optical system has been described though, of course, any system which results in a smaller exit pupil is adequate. If the device is used in infra-red light then the light transmitting devices must be constructed of materials allowing the passage of infra-red light. The objective may be supported at the outer side of a thick protective layer with a radiation path through the layer to the collimating lens at the inner surface of the layer. The thick protective layer may be the armour plate of a vehicle.

The invention also provides an arrangement which may be hand-held to create a view in light of an area of which an image has been scanned with a detector sensitive to selected radiation, which may be infra-red, and converted to a scanned image in visible light by the scanning operations having been carried out by the drum and mirror. Referring to FIG. 1 and ignoring the optical elements M1, L1, P and L2, the drum SD will see an area which subtends an angle of some 60° and sweep an image of this area over the detector D via mirror M2 and lens L3. The signal on output OPI will thus be a waveform representing the sequence of radiation intensity in the line and frame scan. This serial signal, amplified if needed, applied to a single light emitting device LD will generate appropriate light intensity which will pass to lens L4 and form a beam of substantially parallel light for deflection by mirror M2 and drum SD. This deflection will create a scan in a plane transverse to axis OX which scan is an image in light of the area scanned in the selected radiation. To enable a user holding the arrangement to view this image optical lens elements similar to L1 and L2 are provided with L2 close to drum SD and L1 separated by a distance equal to the combined focal lengths of lenses L1 and L2. These elements will form an image of narrower angle than that subtended by the image directly viewable off drum SD and removed from the vicinity of drum SD. The drum, ie the scanning element, passes between lens L2 and the plane of the image viewed through lenses L1 and L2 arranged as now described. The arrangement of drum SD, mirror M2 lens L3, detector D, device LD lens L4 and the viewing elements may be hand held and aimable to view a scene, being connected by a cable if required to a power supply and any extra signal processing equipment. The use of the viewing elements similar to L1 and L2 permits the use of a small drum and provides a narrow aperture image suitable for viewing by eye while the small drum permits the high drum speed and small total size of the equipment to provide usefully high line scan rates and hand held use. Clearly the optical elements L1 and L2 can be added as required eg by mounting them on a turret in front of the drum SD, to permit the examination of a part of the area of view in enlarged form.

What I claim is:

1. In a scanning imaging system of an objective lens supported for forming a first image with radiation collected from an area of view and a scanning arrangement operable to scan radiation from said first image over a detector to form the scanned image the improvement of a collimating lens between the objective and a rotating parallel-faceted scanning element smaller than that required for the first image for forming from said first image a second enlarged image of said area thereby to direct the radiation collected from the area toward a collimating lens exit pupil of smaller aperture than the radiation collecting aperture and occurring within the rotational sweep of said smaller scanning element for deflection of said radiation onto said detector by said smaller scanning element rotatably passing between the collimating lens and its exit pupil.

2. In a system according to claim 1 a scanning element of a drum, some 50mm diameter and having between 12 and 20 facets, rotatable in operation to pass facets between said collimating lens and its exit pupil.

3. In a system according to claim 1 for installation behind a thick protective layer the supporting of the objective at the outer side of the layer with a radiation path through the layer to the collimating lens and scanning element at the inner surface.

4. In a system according to claim 1 a further oscillating scanning element operable in cooperation with the rotating element to provide a scan transverse to that of said scanning element of the radiation deflected onto the detector.

5. In a system according to claim 4 a scan conversion arrangement of a light emitting device energisable sequentially with information from said detector to pass parallel light representing said scanned collected radiation through said further scanning element and said scanning element in turn to recreate a scanned image in said light of the area of view.

6. In an imaging system according to claim 5 means to pick-up the recreated image and means to vibrate said pick-up means in dependence on vibration to which the system is subjected to reduce loss of resolution in the detected scanned radiation.

7. In a system according to claim 4 a detector including a line of a plurality of elements and means responsive to the output of individual elements to coordinate the time displaced outputs of an element corresponding to the same part of the area of view and means to display the coordinated outputs as a scanned image of the area of view.

8. In a scanning imaging system including a scanning arrangement of a faceted mirror drum and a plane mirror operable to scan an image formed in a particular radiation across a detector sensitive to said radiation the improvement of supplying a sequential output signal of the scanned image from the detector to a light emitting element arranged to emit light sequentially in dependence on the intensity of radiation in the scanned image through a collimating lens for application as substantially parallel light to said plane mirror and a parallel-faceted mirror drum to recreate in light the image scanned in said radiation by the cooperative oscillation of the plane mirror and rotation of the drum scanning said light in two substantially perpendicular directions and providing means to view the image away from the vicinity of the drum including an objective lens and an eyepiece to reduce the angle subtended by the image recreated by the angular displacement of the facets of rotating drum.

9. In a system according to claim 8 an objective lens and a collimating lens to collect said radiation from a smaller angle of view than that of a drum facet and supply said radiation as substantially parallel rays through an exit pupil of the collimating lens falling within the circumcircle of the drum facets.

10. A scanning image conversion system including in a hand holdable assembly a rotatable image scanning drum having facets parallel to the axis of rotation and an oscillatable plane mirror aimable in cooperation with the rotation of the drum to scan an image in a selected invisible radiation of an area of view across a detector, means to generate light in dependence on the radiation intensity of said scanned image from radiation intensity information supplied over a single channel and supply said light as a parallel beam to said mirror and drum for scanning said beam to recreate the image for direct viewing by eye in visible light with the aid of a lens system including an element close to the drum with an entry pupil plane within the drum, to reduce the angle subtended by the recreated image.

11. A system avoiding to claim 10 including a further lens system selectively interposable between the drum and the area of view to enlarge the image of part of the area of view, the further lens system including an objective to collect radiation from the area and form a first image and a collimating lens to form a second enlarged image of said area radiation collected from said part of the area through a collimating lens exit pupil of smaller aperture than the radiation collecting aperture positioned within the circumcircle of the scanning drum.

* * * * *

Disclaimer

4,008,371.—*Donald Robert Barron*, Sunbury-on-Thames, England. IMAGING SYSTEMS. Patent dated Feb. 15, 1977. Disclaimer filed Oct. 9, 1980, by the assignee, *EMI Limited*.

Hereby enters this disclaimer to claims 1 through 11 of said patent.

[*Official Gazette December 9, 1980.*]